United States Patent
Kohl et al.

(10) Patent No.: US 12,468,773 B2
(45) Date of Patent: Nov. 11, 2025

(54) CONFIGURABLE PREVIEW OF DYNAMIC CDN RENDERED WEBSITES

(71) Applicant: BBY SOLUTIONS, INC., Richfield, MN (US)

(72) Inventors: Kurt Kohl, So. St. Paul, MN (US); David Adolphson, Apple Valley, MN (US); Marc Petersen, Osseo, MN (US); Praveen Kotla, Apple Valley, MN (US); Sean Walker, Apple Valley, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 24 days.

(21) Appl. No.: 17/671,087

(22) Filed: Feb. 14, 2022

(65) Prior Publication Data
US 2023/0259574 A1    Aug. 17, 2023

(51) Int. Cl.
*G06F 16/957* (2019.01)
*G06F 16/9535* (2019.01)
*G06F 16/958* (2019.01)

(52) U.S. Cl.
CPC ...... *G06F 16/9577* (2019.01); *G06F 16/9535* (2019.01); *G06F 16/9574* (2019.01); *G06F 16/986* (2019.01)

(58) Field of Classification Search
CPC ............. G06F 16/9577; G06F 16/9574; G06F 16/986; G06F 16/9535
See application file for complete search history.

(56) References Cited

U.S. PATENT DOCUMENTS

| | | | |
|---|---|---|---|
| 10,223,239 B1* | 3/2019 | Ghanbaran | G06F 11/3672 |
| 2004/0162886 A1* | 8/2004 | Ims | G06F 16/9574 709/213 |
| 2009/0150518 A1* | 6/2009 | Lewin | H04L 67/568 709/219 |
| 2009/0279673 A1 | 11/2009 | Maffre et al. | |
| 2012/0239731 A1* | 9/2012 | Shyamsunder | G06F 16/955 709/203 |
| 2013/0238974 A1* | 9/2013 | Beltramo, Jr. | G06Q 30/02 715/234 |
| 2015/0095820 A1* | 4/2015 | Fellman | G06F 3/04847 715/765 |

(Continued)

OTHER PUBLICATIONS

"Web Application UI Testing with TestComplete", Smartbear®. [online]. [archived Aug. 13, 2021]. Retrieved via the Internet: <URL: https://web.archive.org/web/20210813094824/https://smartbear.com/product/testcomplete/web-testing/>, (Aug. 2021), 4 pgs.

*Primary Examiner* — Matthew Ell
(74) *Attorney, Agent, or Firm* — Schwegman, Lundberg & Woessner, P.A.

(57) ABSTRACT

Systems and techniques for configurable preview of dynamic CDN rendered websites are described herein. A request may be received for a webpage that includes a configuration bundle. A content request may be generated for a content fragment of the webpage using parameters in the configuration bundle. The content request may be transmitted to a content provider. Instructions may be generated for rendering the content fragment based on a response to the content request. The instructions may be transmitted to a content delivery network (CDN).

24 Claims, 9 Drawing Sheets

(56) References Cited

U.S. PATENT DOCUMENTS

| | | | |
|---|---|---|---|
| 2015/0161277 A1* | 6/2015 | Heller | G06F 16/954 |
| | | | 715/229 |
| 2019/0205919 A1* | 7/2019 | Goksel | G06N 20/10 |
| 2020/0257698 A1* | 8/2020 | Martinez | G06F 16/168 |
| 2022/0092144 A1* | 3/2022 | Brocato | H04L 67/02 |
| 2023/0101763 A1* | 3/2023 | Bloch | G06F 16/972 |
| | | | 715/234 |

* cited by examiner

FIG. 3

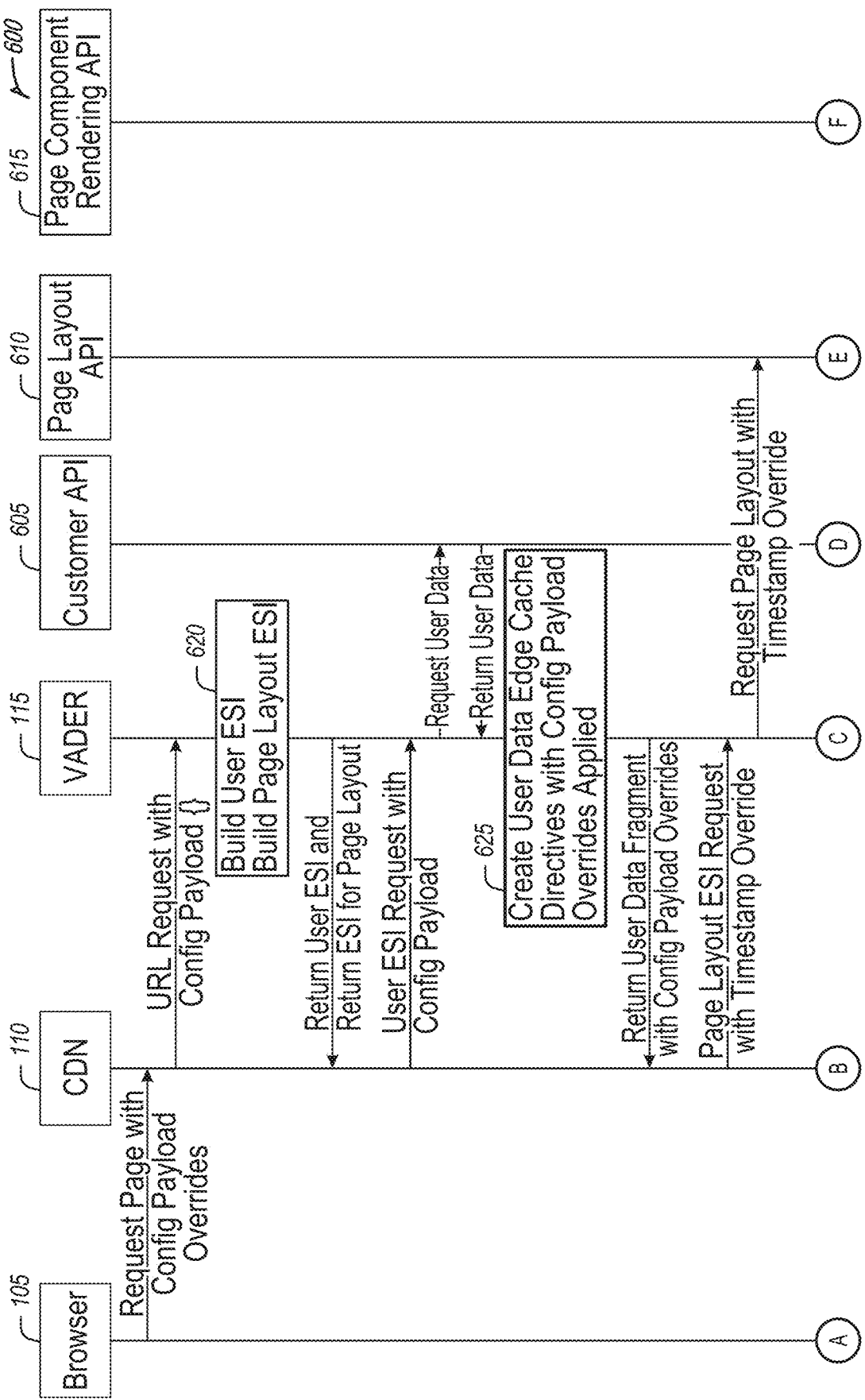

CONFIGURABLE PREVIEW OF DYNAMIC CDN RENDERED WEBSITES

TECHNICAL FIELD

Embodiments described herein generally relate to website testing and debugging and, in some embodiments, more specifically to a configurable preview of dynamic content delivery network (CDN) rendered websites for testing and debugging.

BACKGROUND

Large and complex websites may use multiple content providers (e.g., servers, services, etc.) that provide content fragments used to render a webpage for viewing in a web browser. The content fragments may be personalized for the user based on profile attributes, location data, etc. Testing a complex webpage to validate programming changes and the like may be complicated by the variety of different systems that may be responsible for delivering page content. It may be desired to simplify configuration of testing parameters to enable reconfiguration of a webpage request from a central interface rather than configuring individual use cases in each system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates an example of a graphical user interface for user selection of configuration options for configurable preview of dynamic CDN rendered websites, according to an embodiment.

DETAILED DESCRIPTION

Figure 1:
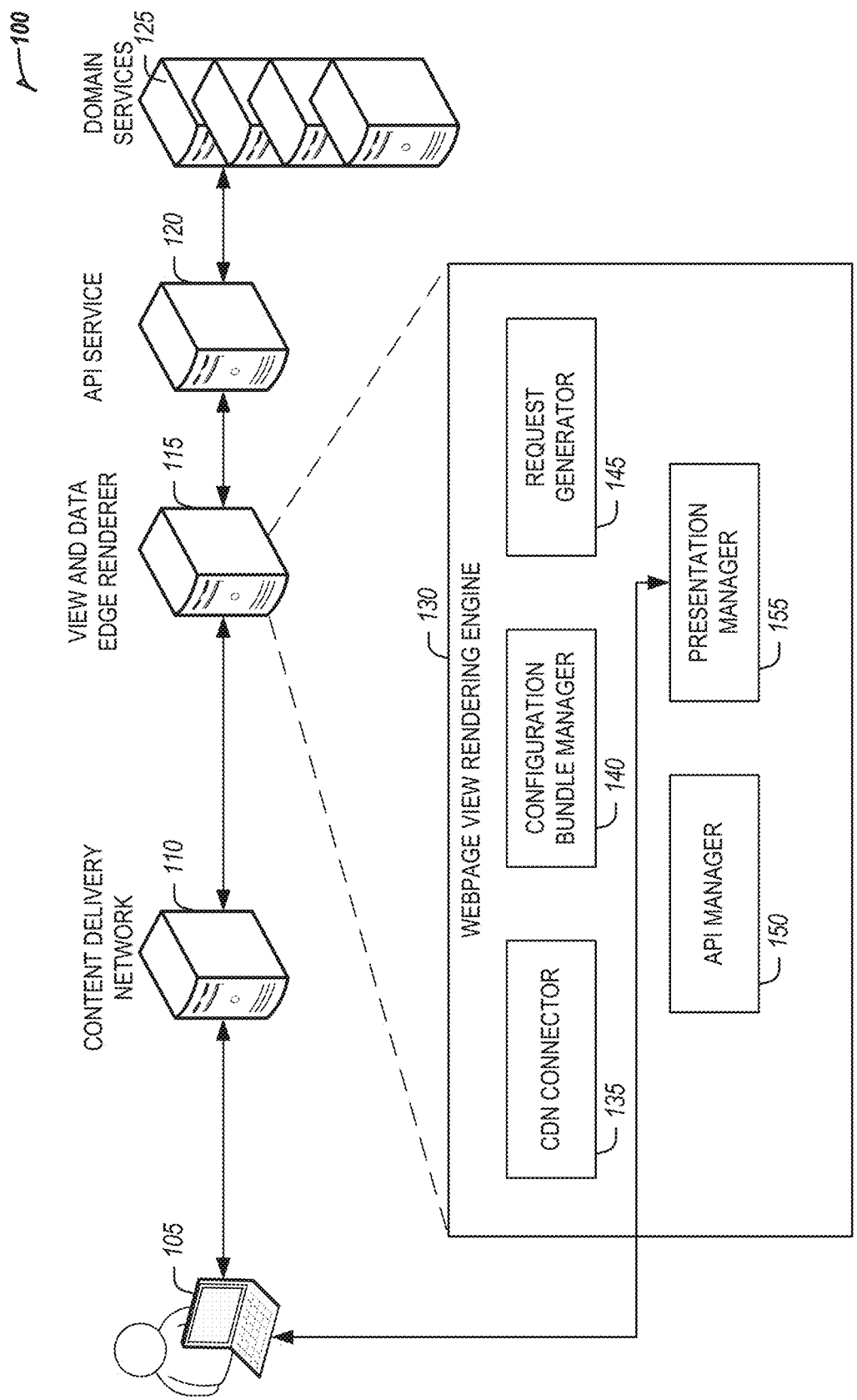
FIG. 1 is a block diagram of an example of an environment and a system for configurable preview of dynamic CDN rendered websites, according to an embodiment.

Conventional techniques for website previews may allow past versions of webpages to be viewed with history keeping tools, but do not allow users to manipulate configuration of the webpages. In the conventional techniques, a returned page is a default view of a page and not a logged-in view accessible on a public website. The conventional techniques for website previews may not allow viewing how a website appears on different screen sizes, in different web browsers, from different locations, or with targeted advertising data or with various user profiles or feature flags toggled.

Conventional tools exist that allow individual page components to be configured to return different data based on a set of configuration parameters, but such conventional tools do not provide an ability to view an entire webpage that has been built with the same configuration set. Without being able to view the entire page with a configuration set, the reviewer cannot determine if layout issues, style conflicts, or other rendering conflicts will arise. The conventional tools allow individual object configuration that may be used in non-production environments, using different data than the production environment, and do not allow website reviewers to view the same data and data layout that a customer will see before data and layout changes are published.

The systems and techniques discussed herein provide an ability to view a website in a different state such that a user may define a future or past timestamp or overrides of various user attributes in order to easily test future scenarios or user-specific scenarios. As used herein, a configuration bundle is a formatted group of configuration options containing details like a timestamp, user attribute overrides, etc. As used herein, a content delivery network (CDN) is a first layer that provides user interaction capabilities. The CDN may include a collection of data stores and servers at network edges that serve website content. As used herein, a view and data edge renderer resides in an application tier primarily responsible for orchestrating the systems and techniques discussed herein.

The systems and techniques discussed herein allow website content administrators to holistically review an entire website experience that is custom built to a targeted subset of users. Due to the complexity of large dynamic websites (e.g., ecommerce websites, etc.), ensuring all of the page components work harmoniously together may be difficult to guarantee, due to the interplay between image placement, CSS styles, region specific content (e.g., sale or promotional content), and other targeted experiences before the page is available to the customer. The systems and techniques discussed herein, enable web content reviewers to configure a future date, location, and other relevant configuration details to preview a page in its entirety before the page is available to a customer. The use of content of a previewed page also may be used to verify and alert relevant teams to address incongruities before the page goes live.

The systems and techniques discussed herein enable faster and simpler testing by enabling a website reviewer to easily configure a precise user scenario to test, receive back the entire webpage, and validate that the page returned to customers with the configured scenario parameters will be identical to the tested page. Testing scenarios that may be simplified include, but are not limited to: Layout testing to determine how webpage components line up with each other; Style testing with global cascading style sheets (CSS) styles and individual component CSS styles to identify unintentional styling conflicts that may be identified and mitigated; Feature testing to validate that special user-based options (e.g., pricing, etc.) for a given scenario output as expected, etc. These features enable website developers to validate code changes to ensure the code changes are working as expected and enable business analysts to ensure generated content renders correctly.

With conventional website testing techniques, replicating the same behavior for testing scenarios may take N number of test user accounts, where N is each variation and combination of configurable data that the website provides. Maintaining and testing each of these user accounts may be tedious and time consuming in comparison to allowing a reviewer to change each configuration option on the fly as enabled by the systems and techniques discussed herein.

The systems and techniques discussed herein also enable an ability to audit past versions of the website. Advertisements and layouts from previous unique events from a previous year may factor into how an upcoming unique event is handled and advertised. For example, user experience designers building a next full page Black Friday advertisement may review a Black Friday advertisement from prior years to provide a starting point and -building block for the look and feel of the next full page Black Friday advertisement. The ability to accurately view future and past content (e.g., prices, etc.) may enable web content reviewers to see current content for an item (e.g., current price, etc.), future content for the item (e.g., a sale price, etc.), and a future return to the current content (e.g., the current price, etc.) are all correct. For example, past prices and views of the website may be used for financial auditing that a sale took place and to appropriately bill vendors who paid to have their products advertised.

The systems and techniques discussed herein enable future site testing safely in production. Production systems that return live data to customers are designed to return currently available data. For example, when an offer management system is queried for a price of an item, it returns the current best price for that item. Making the same query tomorrow would return different results based on what best offers are available tomorrow. Changing the date the offer management system uses to return data would change the way it behaves for all queries. Testing that the offer management system returns the correct price tomorrow for an item may mean changing the configuration for the application either in a non-production environment (where the dataset is not the same) or changing the configuration of the entire system to test future scenarios. A risk of customers seeing incorrect data may be mitigated by temporarily changing the configuration in a time of low customer activity but the risk still exists for testing configuration changes this way. With the systems and techniques discussed herein, production systems support configurable options, and safely return production data to authenticated users without creating any risks to exposing test scenarios to production customers.

The systems and techniques discussed herein enable personalization and segmentation. Live websites (e.g., ecommerce sites, etc.) pull information from a variety of places to customize an experience for a user. By requesting geographical coordinates of the user, websites may set geographical content options for the user. For example, a "local store" for a user may be set to a nearest brick and mortar location for the user. What the user has previously viewed may be stored in a user profile for that user if the user was logged in while they browsed the website. However, profile type data may be stored in a current session of a user or in cookies stored on a device of the user. Testing the way that a website renders for these scenarios may be difficult using conventional testing techniques because cookies would have to be manually created to mimic a viewing history and a tester would have to physically move to a geographical location or spoof an internet protocol (IP) address to appear in a different location to test whether user-specific or geographically specific functionality is working as expected. Similarly other unique user attributes may be difficult to configure using conventional testing techniques such as whether the user is enrolled in a member program or other user specific offerings.

The systems and techniques discussed herein also enable A/B and multivariate test validation that enable easy selection and viewing of each variation of a supported test. Both manual and automated testing is easier to complete because the supported A/B and Multivariate testing scenarios are listed in a user interface for a user to select and are available for automated testing. Manual testers using a graphical user interface (GUI) may see and select each different option while automated tests may iterate through each testing scenario to evaluate a response against an expected outcome.

FIG. 1 is a block diagram of an example of an environment 110 and a system 130 for configurable preview of dynamic CDN rendered websites, according to an embodiment. The environment 100 may include a user computing device 105, content delivery network (CDN) 110, a view and data edge renderer (hereinafter "VADER") 115, an application programming interface (API) service 120, and domain services 125.

The user computing device 105 may be used by a user to submit a request for a webpage of a website. In an example, special instructions or directives (e.g., from the client device 105) may cause the CDN 110 to instruct VADER to generate a preview of a webpage or website. For example, the user computing device 105 may include a web browser that may be used by the user to make the request. The request may be received by the CDN 110. The CDN 110 may include an edge cache that includes content fragments, page layouts, and instructions for returning the webpage to the user. For example, the CDN 110 may use cached content and edge-side include (ESI) instructions and content directives to compile and return the webpage to the user. The CDN 110 may process the request for the webpage by sending requests to the VADER 115 for ESI instructions or other directives for personalizing content and to retrieve content that may not be present in a cache of the CDN 110.

The VADER 115 may transmit an API call to the API service 120 to obtain content from the domain services 125. For example, the VADER 115 may create and transmit a user data API call to a user data API of the API service 120 to obtain user specific data from a user data store of the domain services 125.

The VADER 115 may include the system 130. In an example, the system 130 may be a webpage view rendering engine. The system 130 may include a variety of components including a CDN connector 135, a configuration bundle manager 140, a request generator 145, an API manager 150, and a presentation manager 155.

The CDN connector 135 may establish a connection between the system 130 and the CDN 110. Requests for a webpage that include a configuration bundle may be received from the CDN 110 via the CDN connector 135. Instructions, directives, and content retrieved may be transmitted to the CDN 110 via the CDN connector 135.

The configuration bundle manager 140 may work in conjunction with the presentation manager 155 to present a configuration graphical user interface (GUI) (e.g., the GUI 300 described later in FIG. 3, etc.) to a user of the user computing device 105. The presentation manager 155 may present the GUI and may provide security by allowing interaction with GUI controls to which the user has permissions as determined using, by way of example and not limitation, network security based on internet protocol (IP) address, authentication of user account credentials, etc. The user may select a variety of configuration options for a webpage request that will be used to mimic a user request for testing. Configuration option may include, by way of example and not limitation, a time, a date, a membership level of a user, recently viewed pages, geolocation data, etc. that may alter parameters of a request for a webpage. When the user submits the selected options, the configuration bundle manager 140 generates a configuration bundle. For example, the configuration bundle may be generated in JavaScript Object Notation (JSON). While JSON is used as an example, the configuration bundle may be implemented in a variety of data formats including, extensible markup language (XML) or other markup languages, serialized Java objects, etc.

The configuration bundle manager 140 may transmit the configuration bundle 140 to the request generator 145. The request generator may evaluate the configuration bundle and the request for the webpage and may identify content that will be used to render the webpage. The request generator may work in conjunction with the API manager 150 to generate API calls to be submitted to the API service 120 to retrieve content, ESI instructions, page layouts, or other directives for content fragments from the domain services 125 using the configuration bundle. For example, a request for user data may be made via an API call in which the user data of the user is overridden with configuration parameters from the configuration bundle such as a membership level, having a particular product or service, with a past or future data and time, etc. that returns content fragments that correspond with the configuration bundle rather than the user that created the configuration bundle.

The retrieved content fragments, ESI instructions, page layout, and other directives may be transmitted to the CDN 110 via the CDN connector 135. The CDN 110 may return the fully rendered webpage to the user computing device 105 for viewing in the web browser of the user. The rendered page will include content selected and derived using the parameters in the configuration bundle based on the configuration options selected by the user. This enables the user to select a varied combination of configurations to test a fully rendered page using one authenticated user session without having to individually configure requests for each content fragment, content provider, or scenario.

In an example, the presentation manager 155 and the configuration bundle 140 may be deployed to a computing device that is separate from the VADER 115. In an example, the configuration bundle 140 and the presentation manager 155 may be implemented in a browser plugin. In another example, the configuration bundle 140 and the presentation manager 155 may be deployed in a different application that the user 105 uses to send modified requests and the modified requests are forwarded to the CDN 110.

Figure 2:
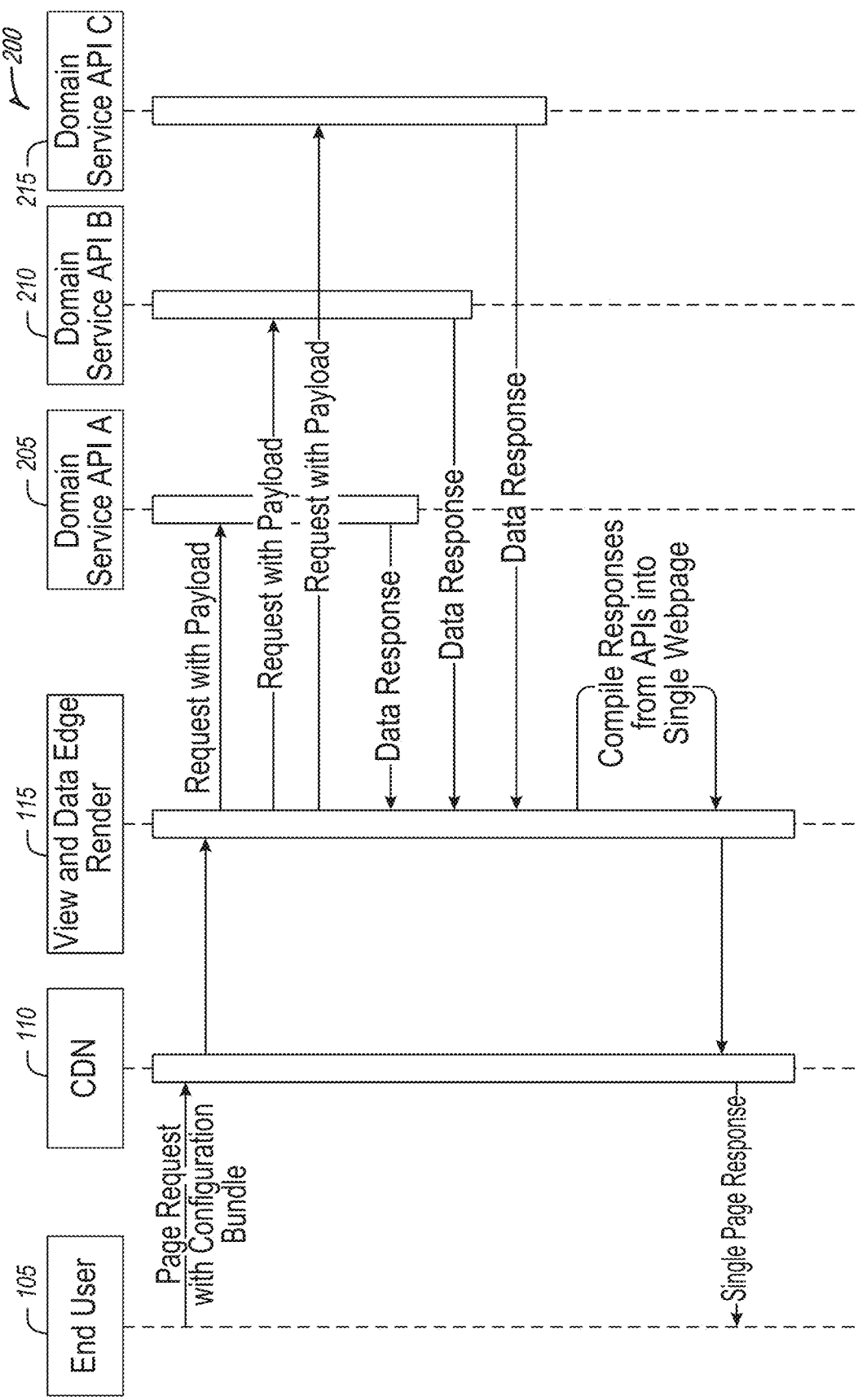
FIG. 2 illustrates a data flow diagram of an example of data flow within an architecture for configurable preview of dynamic CDN rendered websites, according to an embodiment.

FIG. 2 illustrates a data flow diagram of an example of data flow 200 within an architecture for configurable preview of dynamic CDN rendered websites, according to an embodiment. The data flow 200 may provide features as described in FIG. 1.

A user 105 is authenticated and it is determined if the user 105 should be able to access VADER 115 and what permissions the user 105 should have. Multiple layers of security may be used to protect the servers and content from unauthorized access and dissemination. The first layer of security is network level security. When a user requests a page with a configuration bundle, a CDN 110 checks whether the IP address of the user is in a private or restricted network IP range and rejects the request if the user is not in the private or restricted network.

After determining the user is in the private or restricted network the user 105 is redirected to authenticate against an authentication system including by way of example, and not limitation, lightweight directory access protocol (LDAP), open authorization (OAuth), SECUREAUTH® as a second layer of security. Provided the user 105 has the correct entitlements to log in from the authentication system, a user session is created that allows the user 105 to interact with the system. The user 105 is only allowed to configure fields authorized to them by the authentication system. For the duration of the user session, the VADER 115 exchanges a shared secret with the CDN 110 and integrated APIs (e.g., domain service API A 205, domain service API B 210, and domain service API C 215) to authenticate requests are coming from a trusted entity.

After authenticating, the user 105 is presented with a graphical user interface to select configurable options. A user 105 may be provided with configuration options that may change how a website looks and behaves.

Figure 3:
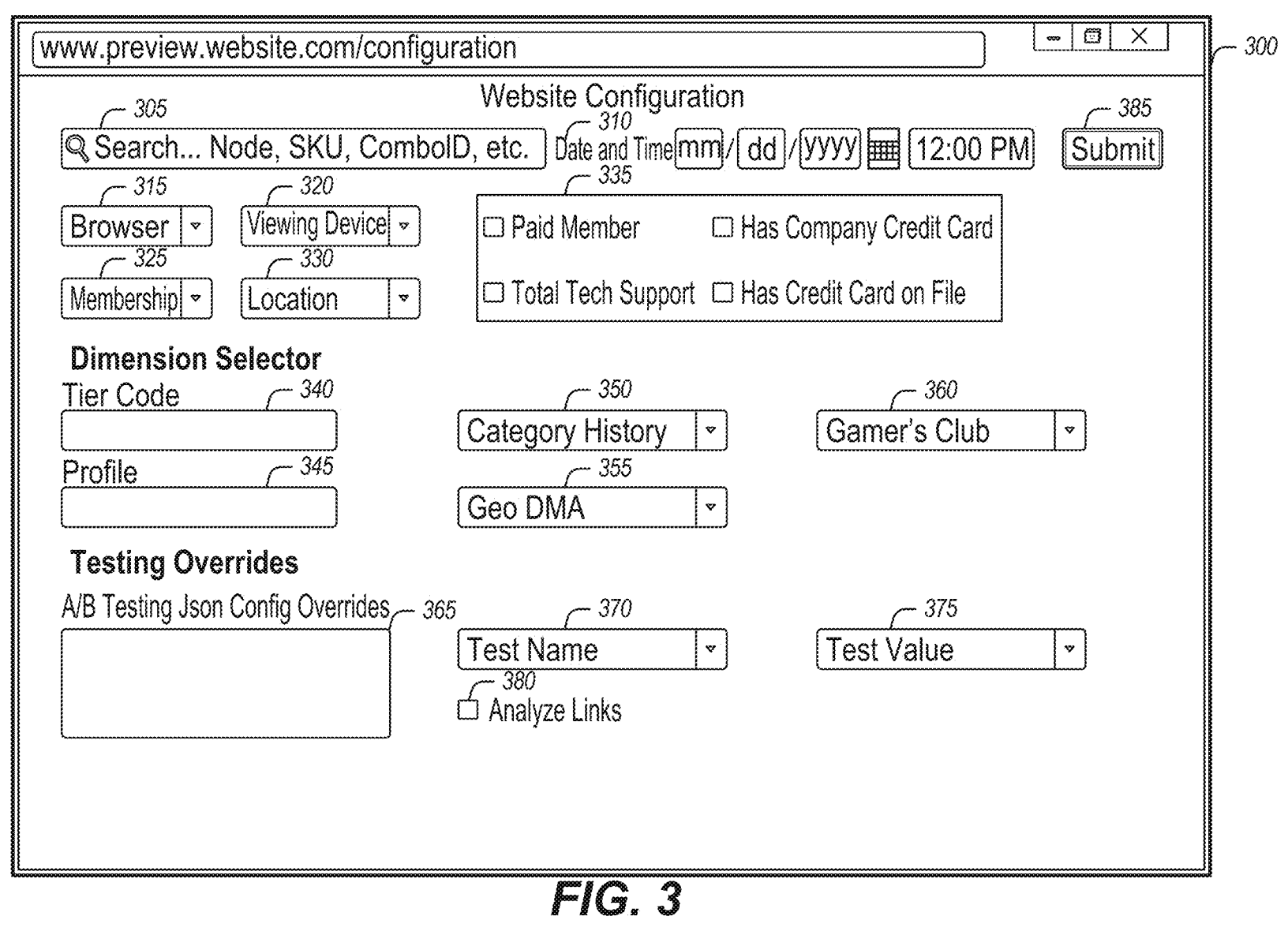

FIG. 3 illustrates an example of a graphical user interface (GUI) 300 for user selection of configuration options for configurable preview of dynamic CDN rendered websites, according to an embodiment. The example GUI 300 may include a variety of controls that the user 105 may use to create a configuration bundle for a test page render. For example, the GUI 300 incudes a search control 305 that may be used to search for a node, stock keeping unit (SKU), identifiers, etc. A date and time control 310 may enable the user 105 to select temporal information for the test configuration indicating a date and time that should be used to configure servers that will return content. A browser control 315 may enable the user 105 to select a browser to be used in a request for content rendering. A device control 320 may enable the user 105 to identify a device or device type to be used in the request for content. A membership control 325 may allow the user 105 to configure a membership level for the request (e.g., whether the request will be submitted as a user that has a membership or not, a membership level, etc.). A location control 330 enables the user 105 to designate a location for the request to simulate geographically customized content to be returned from the request. A variety of status checkboxes 335 may be provided to enable the user 105 to select additional profile elements for the configuration bundle. Personalization selectors may be selected for the configuration by the user via a variety of controls including a tier code control 340, a profile control 345, a category history control, a geographical designated marketing area control 355, a gamer club control 360, etc. Tests may be selected by the user via a test name control 370. Test values may be configured via a test value control 375. A testing override control 365 may enable the user 105 to override certain test configuration parameters. An analyze links checkbox 380 may be provided to enable the user 105 to configure the test to analyze links in returned webpages.

When the user 105 is completed entering configuration information, the user 105 may click a submit button control 385 to generate the configuration bundle and submit the bundle to the VADER 115.

Returning to the description of FIG. 2, the VADER 115 verifies that the user 105 has the correct permissions to see the requested data. Permissions verification may be completed using a variety of authentication techniques as discussed previously including, by way of example and not limitation, LDAP, OAuth, SECUREAUTH®, etc. A series of requests are submitted to production level systems (e.g., the domain services 125 as described in FIG. 1, etc.) with the configuration options via the domain service API A 205, the domain service API B 210, and the domain service API C 215. The production systems fulfill the request for the configuration bundle and return output to the VADER 115. Upon receiving the requested responses, the VADER 115 assembles a complete webpage and returns it to the user 105.

TABLE 1

```
{
  requestedDate: 13:15:00 04/06/2021,
  browser: Opera,
  viewingDevice: iPhone 12,
  membershipLevel: Gold,
  location: {
    latitude: -X.XXX,
    longitude: -Y.YYY
  },
  isPaidMember: true/false,
  hasCompanyCreditCard: true/false,
  hasCreditCardOnFile: true/false,
  emailSubscriberTo: {
    "4k TVS",
    "Gaming Chairs"
  },
  tierCode: "Core/Elite/ElitePlus",
  categoryHistory: "Car Electronics",
  gamersClub: "true",
  geoDma: "MN",
  customerCategories: {
    "College Student",
    "Deal Seeker",
    "Apple Aficinado"
  },
  abTests: {
    ABT_123: "A",
    ABT_456: "B"
  }
}
```

Table 1 illustrates an example of a JavaScript Object Notation (JSON) formatted configuration bundle that may be output based on user 105 selection in the user interface shown in FIG. 3 and submitted to the VADER 115. In an example, the configuration may be manually edited, saved, uploaded by an administrator to define the configuration bundle.

The configuration choices are bundled together into a format that integrated applications may consume. For example, Table 1 illustrates the configuration bundle as a JSON configuration file, but it will be understood that a variety of file structures and file formats may be used for the configuration bundles that may be compatible across platforms providing content for the webpage. The VADER 115 sends the bundled configurations to each integrated including the domain service API A 205, the domain service API B 210, and the domain service API C 215. The APIs tailor their response based on the configured request. After receiving all of the API responses, the VADER 115 builds a complete webpage which is returned to the user 105.

Figure 4:
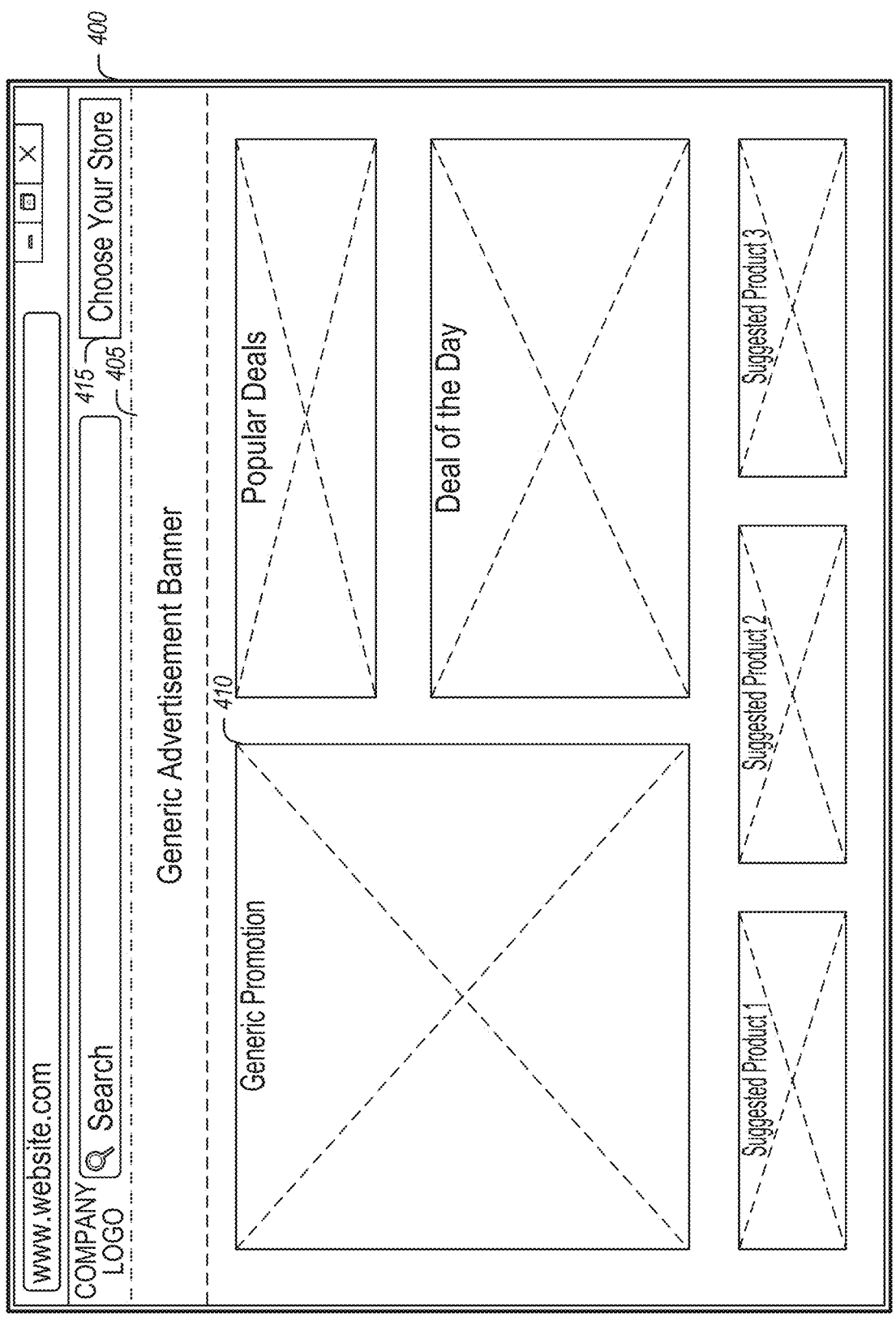
FIG. 4 illustrates an example of a non-configured version of a website for configurable preview of dynamic CDN rendered websites, according to an embodiment.

FIG. 4 illustrates an example of a non-configured version of a website 400 for configurable preview of dynamic CDN rendered websites, according to an embodiment. The non-configured version of a website 400 may include a variety of content fragments including a banner 405 and other content fields 410. When a webpage is returned from content servers (e.g., the CDN 110 as described in FIG. 1, etc.) using content compiled from backend servers (e.g., domain services 125 as described in FIG. 1, etc.), the page is rendered with the appropriate content fragments based on a variety of parameters (e.g., profile values, location values, browser type values, device type values, etc.) that are applicable to a user and browser requesting the page. The user will be presented with a page that is personalized based on the content retrieved based on the parameters. For example, the user may select a store using a select a store control 415 or a current store may be selected for the user and displayed in the select a store control based on an identified geolocation of the computing device used to request the page, a location setting in a profile of the user, etc.

Figure 5:
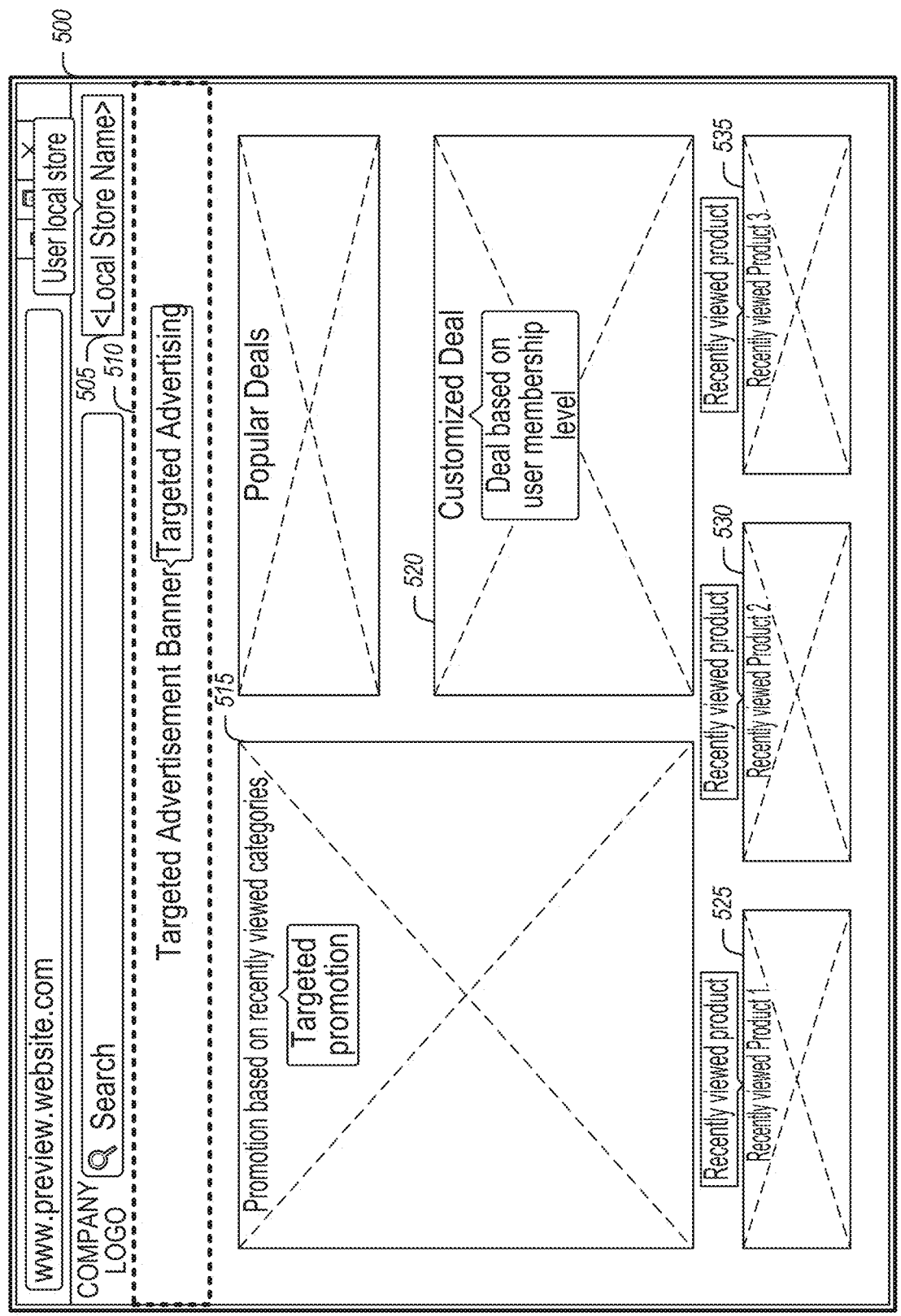
FIG. 5 illustrates an example of a configured version of a website for configurable preview of dynamic CDN rendered websites, according to an embodiment.

FIG. 5 illustrates an example of a configured version of a website 500 for configurable preview of dynamic CDN rendered websites, according to an embodiment. The configured version of a website 500 may provide features as described in FIGS. 1 through 3.

The configured version of a website 500 may include a variety of page fragments (e.g., elements, etc.) that may display personalized content based on parameters passed to the content delivery servers (e.g., similar to those described in FIG. 4, etc.). Different content may be returned based on a configuration bundle created by a testing user that is used in requesting content from the content servers. The configuration bundle may cause the content servers to render content based on parameters in the configuration bundle rather than parameters specific to the testing user. For example, the VADER 115 as described in FIG. 1 may pass the configuration bundle to APIs for various domain services that may output content using configuration bundle parameters by retrieving content for past or future time periods, compiling or retrieving content based on user parameters and/or location parameters included in the configuration bundle. For example, a local store may be provided in a local store fragment 505 based on location data specified in the configuration bundle, a banner fragment 510 may be rendered based on a location or user parameters in the configuration bundle, a promotion fragment 515 may be rendered based on recently viewed categories included in the configuration bundle, a deal fragment 520 may be rendered based on a user member level included in the configuration bundle, and a variety of recently viewed products 525, 530, and 530 may be rendered based on recently viewed products specified in the configuration bundle. The rendering of the fragments may be based on content retrieved from content servers and domain servers using the parameters in the configuration bundle. Thus, the testing user may test a variety of combinations of user, location, temporal, and other parameters to request a fully rendered webpage that corresponds to the selected configuration. This allows the testing user to generate and test full webpage renders from a central interface using a single configuration file.

Figure 6:
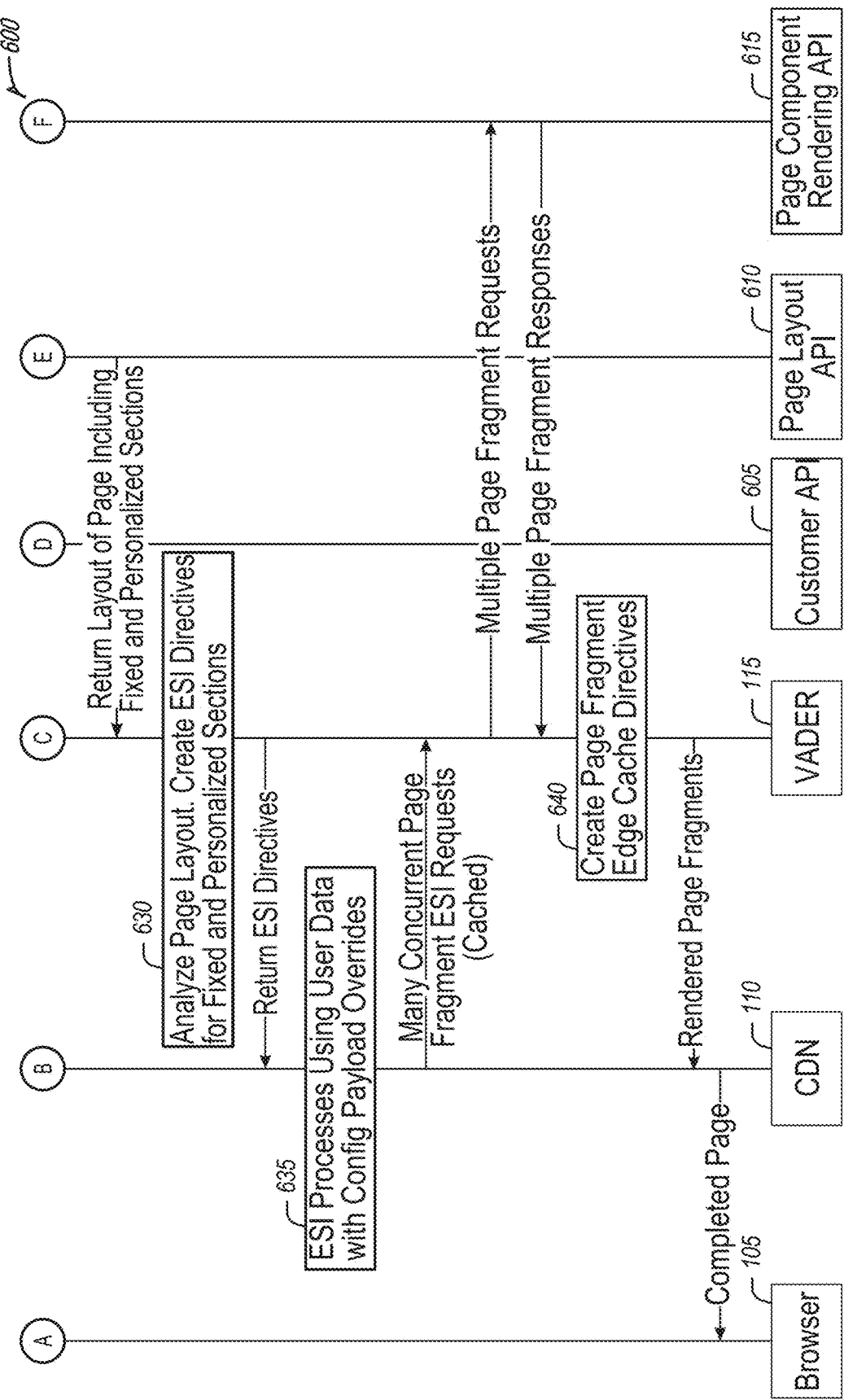
FIG. 6 illustrates a data flow diagram of an example data flow for a CDN cache optimized site architecture for configurable preview of dynamic CDN rendered websites, according to an embodiment.

FIG. 6 illustrates a data flow diagram of an example data flow 600 for a CDN cache optimized site architecture for configurable preview of dynamic CDN rendered websites, according to an embodiment. The data flow 600 may provide features as described in FIGS. 1, 2, 3, and 5.

A user 105 (e.g., tester, developer, etc.) may make a request for a webpage with a configuration bundle (e.g., as created using the GUI 300 as shown in FIG. 3, etc.). The request may be forwarded to a CDN 110 with the configuration bundle to override parameters for the user 105. The VADER 115 receives a request from the CDN 110 that includes the configuration bundle and builds an optimized version of the requested webpage using a combination of cached fragments and freshly retrieved un-cached fragments.

The VADER 115 builds edge-side includes (ESIs) and page layout ESIs based on parameters in the configuration bundle (e.g., at operation 620). The ESIs are returned to the CDN 110 and are processed by the CDN 110. The CDN 110 transmits a user ESI request. The VADER 115 requests and receives user data from a customer API 605. The VADER 115 creates user data edge cache directives with overrides based on parameters in the configuration bundle (e.g., at operation 625).

The VADER 115 returns user data fragments to the CDN 110 and receives a page layout ESI request that may include a timestamp override from the configuration bundle from the CDN 110. The VADER 115 may transmit a request for a page layout with the timestamp override to a page layout API 610. The page layout API 610 may return a layout of the page that includes fixed and personalized sections to the VADER 115. The VADER 115 may analyze the page layout received and may create ESI directives for the fixed and personalized sections (e.g., at operation 630).

The VADER 115 may return the created ESI directives to the CDN 110. The CDN 110 may process the ESI directives using user data with overrides based on the parameters in the configuration bundle (e.g., at operation 635).

The CDN 110 may transmit several concurrent page fragment ESI requests to the VADER 115 that may be cached. The VADER 115 may submit multiple page fragment requests to a page component rendering API 615. The page component rendering API 615 may, in response, return multiple page fragment responses to the VADER 115. The VADER may create page fragment edge directives (e.g., at operation 640). The VADER 115 transmits the rendered page fragments to the CDN 110 and the CDN 110 returns a fully rendered webpage to the browser of the user 105 that includes the page fragments returned using the parameters included in the configuration bundle.

Figure 7:
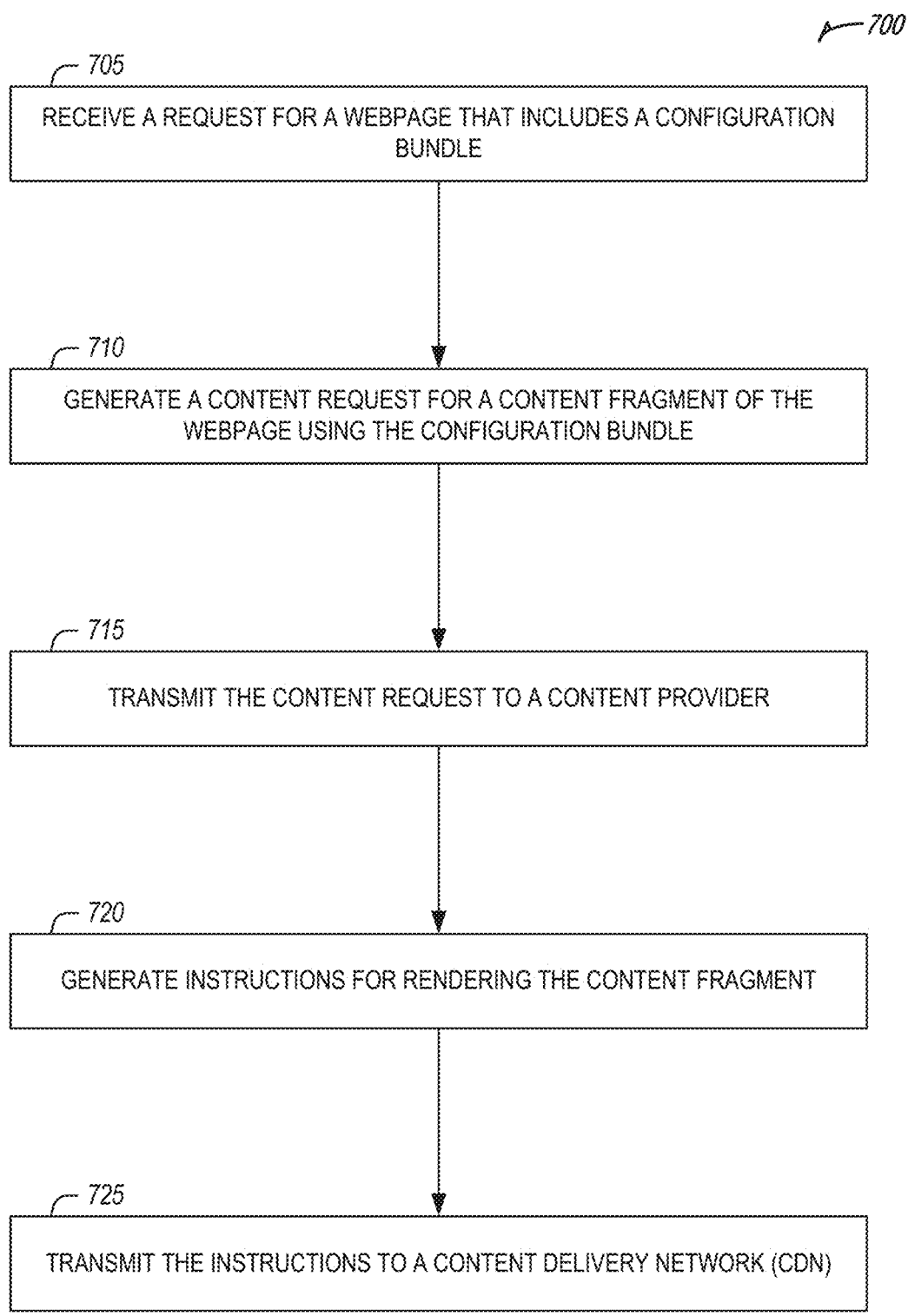
FIG. 7 illustrates an example of a method for configurable preview of dynamic CDN rendered websites, according to an embodiment.

FIG. 7 illustrates an example of a method for configurable preview of dynamic CDN rendered websites, according to an embodiment. The method 700 may provide features as described in FIGS. 1, 2, 3, 5 and 6.

A request may be received (e.g., via the CDN connector 135 as described in FIG. 1, etc.) for a webpage that includes a configuration bundle (e.g., at operation 705). In an example, a request may be received for a configuration graphical user interface from a user. Permissions may be determined for the user. The configuration graphical user interface may be generated (e.g., by the presentation manager 155 as described in FIG. 1, etc.) for display to the user based on the permissions of the user. The request for the webpage may be received that includes the configuration bundle generated upon selection of a submission control included with the configuration graphical user interface. In an example, the configuration bundle may be generated as a block of JavaScript Object Notation (JSON) code included in the request.

A content request may be generated (e.g., by the request generator 145 as described in FIG. 1, etc.) for a content fragment of the webpage using parameters in the configuration bundle (e.g., at operation 710). In an example, the parameters may include at least one of a time, a date, a user attribute, a geolocation attribute, or a domain attribute. In an example, generation (e.g., by the API manager 150 as described in FIG. 1, etc.) of the request for the content fragment of the webpage using the parameters in the configuration bundle may include generation of an application programming interface (API) call that includes the parameters.

A content request may be transmitted (e.g., by the API manager 150 as described in FIG. 1, etc.) to a content provider (e.g., at operation 715). Instructions may be generated (e.g., by the configuration bundle manager 140 as described in FIG. 1, etc.) for rendering the content fragment based on a response to the content request (e.g., at operation 720). In an example, generation of the instructions for rendering the content fragment based on the response to the content request may include generation of edge side include (ESI) instructions for rendering the content fragment by the CDN. The instructions may be transmitted (e.g., via the CDN connector 135 as described in FIG. 1, etc.) to a content delivery network (CDN) (e.g., at operation 725). In an example, the CDN layer may be optional and the content fragment may be passed through in rendering the webpage. The webpage rendered based on the configuration bundle may (or may not) be cached for later retrieval.

In an example, an application programming interface (API) call for a page layout for the webpage based on parameters included in the configuration bundle may be transmitted to the content provider. Edge side include (ESI) directives may be created for the webpage based on the page layout received in response to the API call for the page layout from the content provider and the ESI directives may be transmitted to the CDN.

In an example, user edge side include (ESI) instructions may be generated based on the configuration bundle. The user ESI instructions may be transmitted to the CDN and a request may be received from the CDN for user data. A user data request may be transmitted to the content provider. User data edge cache directives may be created based on the configuration bundle and the data edge cache directives may be transmitted to the CDN.

Figure 8:
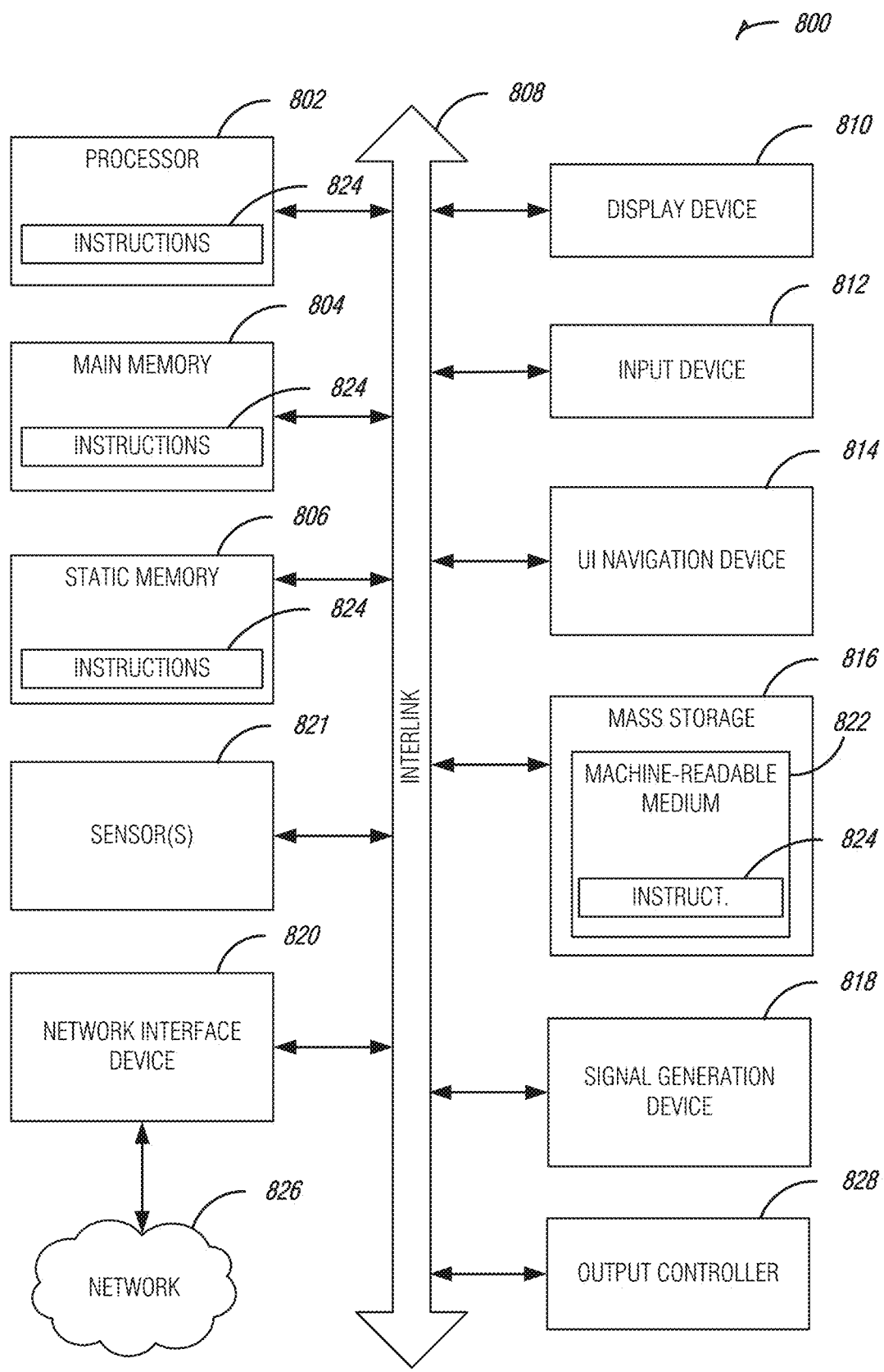
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for generation of a configurable preview of a webpage to be dynamically rendered by a content delivery network comprising:
   at least one processor; and
   memory including instructions that, when executed by the at least one processor, cause the at least one processor to perform operations to:
      provide a configuration graphical user interface, the configuration graphical user interface including a set of interactive request configuration option controls;
      in response to receipt of selection of one or more of the set of interactive request configuration option controls by a requesting user, generate a configuration bundle based on the selection that alters request parameters of a request for a webpage;
      receive the request for the webpage that includes the altered request parameters of the configuration bundle for gathering and configuring webpage components for rendering the webpage, the configuration bundle including testing override user attribute parameters for rendering a configurable preview of the webpage, wherein the configurable preview is rendered using the testing override user attribute parameters included in the configuration bundle in place of a standard view available to be rendered using user attribute parameters associated with the requesting user;
      generate a content request for a content fragment of the webpage using content fragment retrieval parameters in the configuration bundle;
      transmit the content request to a content provider;
      generate instructions for rendering the content fragment based on a response to the content request obtained from the content provider, wherein the instructions for rendering the content fragment override default rendering instructions for the content fragment using the content fragment retrieval parameters in the configuration bundle; and
      transmit the generated instructions for rendering the content fragment to a content delivery network (CDN) for rendering the configurable preview of the webpage using the content fragment and other content fragments.

2. The system of claim 1, the memory further comprising instructions that, when executed by the at least one processor, cause the at least one processor to perform operations to:
   receive a request for the configuration graphical user interface from a user;
   determine permissions of the user;
   generate the configuration graphical user interface for display to the user based on the permissions of the user; and
   receive the request for the webpage that includes the configuration bundle generated upon selection of a submission control included with the configuration graphical user interface.

3. The system of claim 2, wherein the configuration bundle is generated as a block of JavaScript Object Notation (JSON) code included in the request.

4. The system of claim 1, wherein the instructions to generate the request for the content fragment of the webpage using the content fragment retrieval parameters in the configuration bundle further comprises instructions to generate an application programming interface (API) call that includes the content fragment retrieval parameters.

5. The system of claim 1, wherein the instructions to generate the instructions for rendering the content fragment based on the response to the content request further comprises instructions to generate edge side include (ESI) instructions for rendering the content fragment by the CDN.

6. The system of claim 1, the memory further comprising instructions that, when executed by the at least one processor, cause the at least one processor to perform operations to:
   transmit an application programming interface (API) call for a page layout for the webpage based on rendering parameters included in the configuration bundle to the content provider;
   create edge side include (ESI) directives for the webpage based on the page layout received in response to the API call for the page layout from the content provider; and
   transmit the ESI directives to the CDN.

7. The system of claim 1, wherein the content fragment retrieval parameters include at least one of a time, a date, a user attribute, a geolocation attribute, or a domain attribute.

8. The system of claim 1, the memory further comprising instructions that, when executed by the at least one processor, cause the at least one processor to perform operations to:
   generate user edge side include (ESI) instructions based on the configuration bundle;
   transmit the user ESI instructions to the CDN;

receive a request from the CDN for user data;
transmit a user data request to the content provider;
create user data edge cache directives based on the configuration bundle; and
transmitting the user data edge cache directives to the CDN.

9. At least one non-transitory machine-readable medium including instructions for generation of a configurable preview of a webpage to be dynamically rendered by a content delivery network comprising that, when executed by at least one processor, cause the at least one processor to perform operations to:
provide a configuration graphical user interface, the configuration graphical user interface including a set of interactive request configuration option controls;
in response to receipt of selection of one or more of the set of interactive request configuration option controls by a requesting user, generate a configuration bundle based on the selection that alters request parameters of a request for a webpage;
receive the request for the webpage that includes the altered request parameters of the configuration bundle for gathering and configuring webpage components for rendering the webpage, the configuration bundle including testing override user attribute parameters for rendering a configurable preview of the webpage, wherein the configurable preview is rendered using the testing override user attribute parameters included in the configuration bundle in place of a standard view available to be rendered using user attribute parameters associated with the requesting user;
generate a content request for a content fragment of the webpage using content fragment retrieval parameters in the configuration bundle;
transmit the content request to a content provider;
generate instructions for rendering the content fragment based on a response to the content request obtained from the content provider, wherein the instructions for rendering the content fragment override default rendering instructions for the content fragment using the content fragment retrieval parameters in the configuration bundle; and
transmit the generated instructions for rendering the content fragment to a content delivery network (CDN) for rendering the configurable preview of the webpage using the content fragment and other content fragments.

10. The at least one non-transitory machine-readable medium of claim 9, further comprising instructions that, when executed by the at least one processor, cause the at least one processor to perform operations to:
receive a request for the configuration graphical user interface from a user;
determine permissions of the user;
generate the configuration graphical user interface for display to the user based on the permissions of the user; and
receive the request for the webpage that includes the configuration bundle generated upon selection of a submission control included with the configuration graphical user interface.

11. The at least one non-transitory machine-readable medium of claim 10, wherein the configuration bundle is generated as a block of JavaScript Object Notation (JSON) code included in the request.

12. The at least one non-transitory machine-readable medium of claim 9, wherein the instructions to generate the request for the content fragment of the webpage using the content fragment retrieval parameters in the configuration bundle further comprises instructions to generate an application programming interface (API) call that includes the content fragment retrieval parameters.

13. The at least one non-transitory machine-readable medium of claim 9, wherein the instructions to generate the instructions for rendering the content fragment based on the response to the content request further comprises instructions to generate edge side include (ESI) instructions for rendering the content fragment by the CDN.

14. The at least one non-transitory machine-readable medium of claim 9, further comprising instructions that, when executed by the at least one processor, cause the at least one processor to perform operations to:
transmit an application programming interface (API) call for a page layout for the webpage based on rendering parameters included in the configuration bundle to the content provider;
create edge side include (ESI) directives for the webpage based on the page layout received in response to the API call for the page layout from the content provider; and
transmit the ESI directives to the CDN.

15. The at least one non-transitory machine-readable medium of claim 9, wherein the content fragment retrieval parameters include at least one of a time, a date, a user attribute, a geolocation attribute, or a domain attribute.

16. The at least one non-transitory machine-readable medium of claim 9, further comprising instructions that, when executed by the at least one processor, cause the at least one processor to perform operations to:
generate user edge side include (ESI) instructions based on the configuration bundle;
transmit the user ESI instructions to the CDN;
receive a request from the CDN for user data;
transmit a user data request to the content provider;
create user data edge cache directives based on the configuration bundle; and
transmitting the user data edge cache directives to the CDN.

17. A method for generating a configurable preview of a webpage to be dynamically rendered by a content delivery network comprising:
providing a configuration graphical user interface, the configuration graphical user interface including a set of interactive request configuration option controls;
in response to receipt of selection of one or more of the set of interactive request configuration option controls by a requesting user, generating a configuration bundle based on the selection that alters request parameters of a request for a webpage;
receiving the request for the webpage that includes the altered request parameters of the configuration bundle for gathering and configuring webpage components for rendering the webpage, the configuration bundle including testing override user attribute parameters for rendering a configurable preview of the webpage, wherein the configurable preview is rendered using the testing override user attribute parameters included in the configuration bundle in place of a standard view available to be rendered using user attribute parameters associated with the requesting user;
generating a content request for a content fragment of the webpage using content fragment retrieval parameters in the configuration bundle;
transmitting the content request to a content provider;

generating instructions for rendering the content fragment based on a response to the content request obtained from the content provider, wherein the instructions for rendering the content fragment override default rendering instructions for the content fragment using the content fragment retrieval parameters in the configuration bundle; and transmitting the generated instructions for rendering the content fragment to a content delivery network (CDN) for rendering the configurable preview of the webpage using the content fragment and other content fragments.

18. The method of claim 17, further comprising:

receiving a request for the configuration graphical user interface from a user;

determining permissions of the user;

generating the configuration graphical user interface for display to the user based on the permissions of the user; and receiving the request for the webpage that includes the configuration bundle generated upon selection of a submission control included with the configuration graphical user interface.

19. The method of claim 18, wherein the configuration bundle is generated as a block of JavaScript Object Notation (JSON) code included in the request.

20. The method of claim 17, wherein generating the request for the content fragment of the webpage using the content fragment retrieval parameters in the configuration bundle further comprises generating an application programming interface (API) call that includes the content fragment retrieval parameters.

21. The method of claim 17, wherein generating the instructions for rendering the content fragment based on the response to the content request further comprises generating edge side include (ESI) instructions for rendering the content fragment by the CDN.

22. The method of claim 17, further comprising:

transmitting an application programming interface (API) call for a page layout for the webpage based on rendering parameters included in the configuration bundle to the content provider;

creating edge side include (ESI) directives for the webpage based on the page layout received in response to the API call for the page layout from the content provider; and transmitting the ESI directives to the CDN.

23. The method of claim 17, wherein the content fragment retrieval parameters include at least one of a time, a date, a user attribute, a geolocation attribute, or a domain attribute.

24. The method of claim 17, further comprising:

generating user edge side include (ESI) instructions based on the configuration bundle;

transmitting the user ESI instructions to the CDN;

receiving a request from the CDN for user data;

transmitting a user data request to the content provider;

creating user data edge cache directives based on the configuration bundle; and transmitting the user data edge cache directives to the CDN.

\* \* \* \* \*